Patented Oct. 14, 1952

2,614,030

UNITED STATES PATENT OFFICE 2,614,030

MANUFACTURE OF MANGANESE DIOXIDE FROM MANGANOUS SULFATE SOLUTIONS

Jonas Kamlet, New York, N. Y., assignor to The B. F. Goodrich Company, New York, N. Y., a corporation of New York No Drawing. Application November 10, 1949, Serial No. 126,689

8 Claims. (Cl. 23—145)

The present invention relates to the manufacture of manganese dioxide from manganous sulfate solutions. It has for its object to provide a simple, inexpensive procedure whereby manganese dioxide in a high state of chemical purity may be obtained from manganese sulfate solutions. It has for its further object to provide a convenient means for regenerating manganese dioxide, possessing a high degree of chemical reactivity, from manganous sulfate solutions obtained as a by-product of its use as an industrial chemical oxidizing agent. It has for another further object to provide a method whereby manganese sulfate solutions, readily obtainable by the chemical leaching of low grade manganese ores, may be converted to manganese dioxide in a high state of purity. Other and ancillary objects of the invention will become apparent in the course of my description thereof.

Manganous sulfate is obtained as a by-product in a number of industrial organic chemical processes in which manganese dioxide is employed as an oxidizing agent in an aqueous medium containing sulfuric acid. One of the most important of these is the process whereby p-benzoquinone is obtained by the oxidation of aniline with manganese dioxide and sulfuric acid [BIOS Final Report No. 1627, PB Report No. 532, BIOS Final Report No. 773, PB Report No. 58804, PB Report No. 4115, Carus, U. S. Patent 2,144,424 (1939), Gibbs, U. S. Patent 2,343,768 (1944), etc.] The commercial scale regeneration of a highly active $MnO_2$ from this by-product $NnSO_4$, not heretofore effected but made possible by the process of this invention not only obviates the necessity of disposing of large quantities of this by-product, but also lowers the over-all cost of the process and avoids the necessity of purchasing high grade manganese dioxide ores (e. g. pyrolusite) from foreign sources. This is particularly significant in the case of the quinone synthesis from aniline since good yields of the end product require the use of high $MnO_2$-content ores, which are not domestically available.

Manganous sulfate solutions may also be obtained as primary products by the leaching of low-grade manganese ores with sulfur dioxide, sulfur trioxide and/or sulfuric acid. All manganiferous ores such as alabandite, bementite, braunite, brostenite, chalcophanite, coronadite, cryptomelane, gerlioslovakia, hausmannite, hellandite, jacobsite, manganite, manganesiderite, manganesite, nectocite, piedmontite, pelianite, penite, psilomelane, pyrochroite, pyrolusite, rhodochrosite, rhodonite, sitaparite, wad ore and wiserite, can be beneficiated by treatment with one or more of the above reagents, so as to obtain a good recovery of the manganese content thereof in the form of a manganous sulfate solution. (See, for example, U. S. Bureau of Mines Reports of Investigations Nos. 3649 (1942), 3033 (1930), 3609 (1942), 4077 (1947), 3632 (1942), 3681 (1943), and other references cited on page 691 of the Index of "Literature Search on Dry Cell Technology" by Bolen and Weil published 1948 by State Engineering Experiment Station, Georgia Institute of Technology, Atlanta, Ga.).

The process of the present invention provides, therefore, a means for recovering from low grade manganese ores (by the intermediate conversion of the manganese contents of said ores to manganous sulfate solutions) manganese dioxide in a high state of chemical purity, entirely suitable for use in the construction of dry cells, for use in ferrous and non-ferrous metallurgy, and as a highly active organic oxidizing agent. The availability of considerable quantities of low grade manganese ores in the United States, coupled with the simple and inexpensive nature of the process of the present invention, makes possible a completely competitive domestic source for high purity manganese dioxide and thus frees the United States from dependence on imported high grade Caucasian and North African ores.

The process of the invention involves three interrelated steps and may best be understood by the description of each step, seriatim. These steps are referred to as (A) the ion-interchange step, (B) the primary oxidation step and (C) the secondary oxidation step.

A. *The ion-interchange step*

The starting material of the process of the present invention is an aqueous solution of manganous sulfate. Such a solution may be free of other materials but will usually contain free sulfuric acid and may also contain some ammonium sulfate (if derived during the oxidation of the aniline in the above-mentioned p-benzoquinone synthesis), or some ferrous and/or ferric sulfate (if derived from a leached ore also containing some iron compounds), and/or other heavy metal sulfates and/or other impurities such as organic impurities. Any such primary solution may be used directly in any desired $MnSO_4$, concentration, without further treatment.

In the practice of the first step of the process, the primary solution is treated, at room temperature or above, in any convenient reaction vessel of suitable construction, with (a) a quantity of aqueous calcium chloride solution substantially stoichiometrically equivalent to the quantity of manganous sulfate (and, if present, ammonium sulfate) in the primary solution. In the usual event where free sulfuric acid, ferrous sulfate, ferric sulfate and/or other heavy metal sulfates are present in the primary solution, the solution is also treated with (b) an aqueous slurry of milk of lime (calcium hydroxide) substantially stoichiometrically equivalent to the total quantity of free sulfuric acid and/or heavy metal sulfates present. The milk of lime slurry may be of any convenient concentration and may be added to the primary solution before, after or simultaneously with the addition of the calcium chloride solution. The concentration of the calcium chloride solution may vary over a wide range, e. g., 5% to 50%. Since an excess of the by-product $CaCl_2$ solution is obtained in the third step of this process, as will be explained hereinbelow, a portion of this by-product solution may be used in this first step of the process.

The reactions which here occur are:

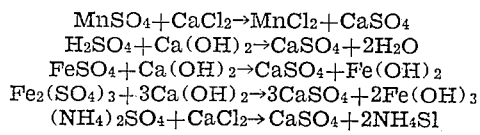

There is thus obtained an aqueous solution of manganous chloride (which may contain ammonium chloride) free of other heavy-metal chlorides, and a precipitate of calcium sulfate which carries down with it, as a closely adsorbed coprecipitate all the ferrous and ferric hydroxides, all the other heavy metal hydroxides, and all organic impurities in the solution. If the original $MnSO_4$ is derived from an organic chemical oxidation (such as aniline to p-benzoquinone), the organic residue of this oxidation is carried down with the calcium sulfate precipitate.

Any ammonium sulfate present in the primary solution is converted to ammonium chloride, and remains in solution with the manganous chloride.

The $MnCl_2$ solution is now separated from the precipitate by any convenient means, such as filtration, centrifuging, sedimentation and decantation, etc. The precipitate, largely or entirely calcium sulfate, may be discarded or used elsewhere outside of the process.

B. *The primary oxidation step*

The primary oxidation step of this process is substantially identical to the oxidizing step of the old and well known Weldon Process, which was extensively operated throughout the world during the latter half of the nineteenth and early part of the twentieth century. An excellent description of the equipment, procedure and operating conditions of the Weldon Process may be found in the text by G. Lunge, Sulfuric Acid and Alkali, first edition, volume III, chapter VI, pages 198–237 inclusive.

The Weldon Process [Chemical News 20, 109 (1869), ibid, 41, 129, 179, 181 (1881), ibid 42, 10, 19 (1881)] is based on the fact that freshly precipitated manganous hydroxide, suspended in a solution of calcium chloride (such as is obtained by reacting $MnCl_2$ with milk of lime), in the presence of an excess of lime, can be oxidized by a current of air or oxygen forced through the liquid, until some 79%–80% of the bivalent manganese is oxidized to the tetravalent form.

The presence of a substantial excess of lime is essential and represents a vital aspect of the Weldon Process. It has been postulated that this excess of lime combines with at least a portion of the tetravalent manganese compounds formed by the oxidation to form calcium manganites which have been assigned formulae such as $CaO.MnO_2$, $CaO.2MnO_2$, $CaH_2(MnO_3)_2$, etc. It is not at all certain that such calcium manganites exist in fact. These may be true compounds, or coordination complexes, or loosely bound addition products or mere intimate physical mixtures of hydrated manganese dioxide and calcium oxide. These calcium manganites react chemically in every sense identically with intimate physical mixtures of $MnO_2$ and $CaO$ and may, for the purposes of the present invention, be considered the substantial equivalent thereof.

The optimum operation of the Weldon Process has been described by Lunge, cited above. The optimum proportions of reagents are given in terms of molar equivalents, for purposes of clarity and ease of explanation. However, this is in no way intended to limit the size of any given oxidation batch to the indicated molar quantities. The process may be operated equally as satisfactorily with batches of $MnCl_2$ solution of any size, using the same preferred relative proportion of reagents throughout. The equipment for effecting this oxidation is also described in detail by Lunge.

In the preferred operation of the Weldon Process, the $MnCl_2$ solution is treated, in two stages, with a 30%–40% stoichiometric excess of aqueous milk of lime slurry (preferably containing 300 to 335 grams CaO and preferably less than 10 grams MgO per liter). Air is blown through the resultant slurry preferably at 8–10 lb. pressure and preferably after the reaction mixture has been warmed to 55°–60° C. by steam, but the oxidation may be effected under other conditions such as at room temperature. The preferred two-stage operation involves first treating a portion of the $MnCl_2$ solution with all of the lime slurry, oxidizing under the conditions indicated for 2½ to 4 hours or until there is no further increase in the $MnO_2$ titer of the solution; then adding the remainder of the $MnCl_2$ solution and continuing the oxidation (i. e., aeration) under the same conditions, i. e., at 55°–60° C., for a further 1½–2 hours or until there is no further increase of the $MnO_2$ titer of the solution. At this point, from 79% to 80% of the manganese ion will be in the tetravalent form, which represents the maximum degree of oxidation obtainable by the Weldon Process.

The $MnCl_2$ solution, when mixed with the milk of lime, yields a light yellow slurry. Air (or any other oxygen-containing gas) may be forced through the solution through a convenient sparger, diffuser plate, aeration cone, etc. in a finely-divided stream. As the oxidation proceeds, the slurry rapidly turns brown and then black, as the manganese dioxide and/or calcium manganites form.

The preferred relative proportions of reagents employed in the first stage of the preferred two stage operation of the Weldon Process consist in the use with 100 moles of $MnCl_2$ solution of 160 moles of milk of lime, when oxidizing in the preferred manner at 55°–60° C. for 2½–4 hours. The empirical equation for this stage of the operation is:

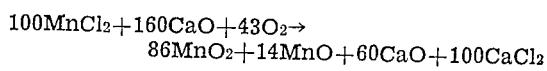

The second stage involves charging the oxidation vessel with a further preferred portion of 24 moles of MnCl₂ solution, and continuing the oxidation of 55°–60° C. for 1½ hours. The empirical equation for this second stage of the operation is:

$$86MnO_2 + 14MnO + 60CaO + 100CaCl_2 + 24MnCl_2 + 6O_2 \rightarrow 98MnO_2 + 26MnO + 36CaO + 124CaCl_2$$

At the conclusion of the oxidation, therefore, 79%–80% of the manganese is present as the tetravalent form, partly as MnO₂ and partly as calcium manganites or mixtures of MnO₂ and CaO. Similarly, 20%–21% of the manganese is present in the divalent form, probably as manganous hydroxide which is largely soluble in the excess of CaCl₂ solution.

The over-all empirical equation for the Weldon Process may therefore be given as:

$$124MnCl_2 + 160CaO + 49O_2 \rightarrow 98MnO_2 + 26MnO + 36CaO + 124CaCl_2$$

All of the reagents are used in the proportions indicated by this empirical equation, except for the oxygen. A large excess of air is blown through the reaction mixture, containing far more oxygen than is required by the above equation. In practice, from 135 to 160 cubic feet of air at normal pressure is required to form one pound of MnO₂ from the equivalent amount of MnCl₂ solution. This is about 13 to 15 times the theoretical amount.

It is understood, of course, that the operation of the process of the present invention is in no way dependent on the exact duplication or adherence to the optimum conditions for operating the Weldon Process. Obvious modifications may be made by those skilled in the art. Thus, the mode and order of addition of the reagents may be changed, the aeration may be effected at a higher or a lower temperature than that indicated, the oxidation may be effected with oxygen or an oxygen-containing gas or any similar changes and improvements may be made in the Weldon Process, as applied to the second step of the process of the present invention without departing from the spirit and purpose of the latter.

When the MnCl₂ solution used in this step contains some ammonium chloride (the source of which is indicated in the first step), the process is modified preferably only to the extent that an additional quantity of milk of lime is added equivalent to the ammonium chloride content, i. e., the total amount of milk of lime used is 160 moles per 124 moles of MgCl₂ plus 0.5 mole per 1.0 mole NH₄Cl. This excess of lime reacts with the NH₄Cl according to the equation:

$$2NH_4Cl + Ca(OH)_2 \rightarrow CaCl_2 + 2NH_3 + 2H_2O$$

The ammonia formed is completely volatilized and removed from the reaction mixture by the current of air being forced through during the oxidation. This current of air may be washed through a sulfuric acid solution, if desired, to recover the ammonia content thereof as a commercially valuable by-product of this process.

C. The secondary oxidation step

After the primary oxidation step the reaction mixture, in the oxidation vessel, preferably comprises per 124 moles of original MnCl₂ solution:

98 moles MnO₂
26 moles MnO
36 moles CaO
124 moles CaCl₂ plus any CaCl₂ formed from NH₄Cl In the secondary oxidation step this reaction mixture is treated in the following manner:

Chlorine gas is passed into the reaction mixture in a finely-divided stream. The chlorine may be introduced through the same diffuser plate, sparger or cone used for the initial aeration (i. e., the primary oxidation step). The chlorination (i. e., the secondary oxidation step) may be effected at room temperature or above. It is most convenient in practice, after discontinuing the aeration in the second step, at 55°–60° C., simply to continue the chlorination (i. e., the third step) with the warm reaction mixture.

The chlorination is continued until substantially all of the divalent manganese in the reaction mixture has been oxidized to the tetravalent state. The reaction may be represented by the equation:

$$CaO + MnO + Cl_2 \rightarrow CaCl_2 + MnO_2$$

and involves the consumption of 26 moles of chlorine to convert the 26 moles of MnO in the reaction mixture to MnO₂. Simultaneously, the CaO content of the mixture (whether present as such or as calcium manganites) is reduced by 26 moles, to a total of 10 moles of CaO.

Thus, at the conclusion of the chlorination, which requires only about ½ to 1 hour, the reaction mixture contains, per 124 moles of original MnCl₂ solution:

124 moles MnO₂
10 moles CaO
124 moles CaCl₂ plus any CaCl₂ formed from NH₄Cl

Combining the primary and secondary oxidation steps of this process, the following empirical equation may be given:

$$124MnCl_2 + 160CaO + 49O_2 + 26Cl_2 \rightarrow 124MnO_2 + 10CaO + 150CaCl_2$$

A substantially quantitative conversion of MnCl₂ to MnO₂ is thus effected.

At this stage of the process, it is completely feasible to filter or centrifuge off the precipitate of MnO₂ (containing a little CaO either as free lime or as calcium manganite) from the solution of CaCl₂. This precipitate will assay, on a dry basis, better than 95% MnO₂, and is completely suitable for most chemical and metallurgical purposes. Thus, it may be used directly in the aniline to p-benzoquinone oxidation. The aniline charge is simply adjusted with a little more sulfuric acid than is usually used, to compensate for the less than 5% CaO content of the MnO₂.

However, if a chemically pure MnO₂ is desired, the reaction mixture, before filtration, is neutralized with the exact quantity of hydrochloric acid solution required to convert all of the CaO (either as free lime or calcium manganite) to CaCl₂. The precipitate of chemically pure MnO₂ is then separated, as by filtering or centrifuging, from the CaCl₂ solution, preferably washed with a little water and dried in any convenient manner.

A portion of the CaCl₂ solution thus obtained may be returned to the process, in step A, to react with the original MnSO₄ solution. Since 124 moles of MnSO₄ solution will yield 124 moles of MnCl₂, and the latter, when treated in steps B and C of this process, will yield at least 150 moles of CaCl₂ solution (plus any CaCl₂ solution formed due to the presence of (NH₄)₂SO₄ originally in the MnSO₄ liquor plus any CaCl₂ formed by the neutralization of free lime in step C) there will always remain a small excess of CaCl₂ solution over that required for recycling to the first step of the process.

Empirically, the process of the invention may be summarized in the following manner:

124MnSO₄+160CaO+49O₂+26Cl₂→
124MnO₂+10CaO+124CaSO₄+26CaCl₂

To obtain one pound of MnO₂ (as a 95%+ product with a little free lime) there is required, therefore:

1.74 lbs. MnSO₄
0.83 lb. CaO
0.172 lb. chlorine
130 cu. ft. of air

To obtain one pound of chemically pure MnO₂, there is required in addition 0.19 lb. of 20° Bé. hydrochloric acid.

Analytical procedures for assaying the MnO, MnO₂, CaO and CaCl₂ content of the various reagents and reaction mixtures of the process of the present invention are given by Lunge (cited above) on pp. 230–233 of Sulfuric Acid and Alkali, volume III (London, 1880).

The following examples are given to illustrate the present invention in greater detail, but in no way to limit it to the precise reactants, proportions or conditions described therein. Modifications and variations will occur to any person skilled in the art.

*Example I*

The residual liquor remaining after the oxidation of 500 liters of aniline, according to the procedure described in PB Report No. 4115, is treated with sufficient sulfur dioxide gas or sodium sulfite to reduce all of the unreacted MnO₂ therein to MnSO₄. There is thus obtained about 12,000 liters of aqueous solution containing:

1965 kgs. of MnSO₄ (13.0 moles)
108 kgs. of H₂SO₄ (1.1 moles)
330 kgs. of (NH₄)₂SO₄ (2.5 moles)

and a total of 0.24 mole of sulfate ions in the form of ferrous and ferric sulfates.

To this liquor there is now added 7910 liters of 20% aqueous CaCl₂ solution (14.25 moles—13.0 moles for the MnSO₄ and 1.25 moles for the (NH₄)₂SO₄) and 75.6 kgs. of CaO (as a milk of lime slurry containing 330 gms. CaO/liter) (1.35 moles—1.10 moles for the free H₂SO₄ and 0.25 mole for the ferrous and ferric sulfate).

The precipitated calcium sulfate (which also carries down organic matter and iron hydroxides) is now filtered off, and washed with a little water. The filtrate and washings will contain 13.0 kg.-moles of MnCl₂ and 5.0 kg.-moles of NH₄Cl in a total of 20,000 liters of solution, or 0.65M manganous chloride and 0.25M ammonium chloride.

This MnCl₂ solution is oxidized in batches of 12.4 kg.-moles each, using per batch 1031 kgs. of CaO (as a slurry containing 330 gms. CaO/liter) (equivalent to 16.0 kg.-moles for the MnCl₂ as required by the Weldon process and 2.4 kg.-moles for the NH₄Cl).

Ten kg.-moles of the MnCl₂ solution is mixed with the entire 18.4 kg.-moles of milk of lime, heated by steam to 55°–60° C., aerated for 2½ to 4 hours until no further increase in MnO₂ titer occurs after 15 minutes of consecutive aeration. The remaining 2.4 kg.-moles of MnCl₂ solution is then added, and the aeration continued for 1½ to 2 hours until a total of 79%–80% of the total manganese is present in the tetravalent state.

All of the ammonia originally present is volatilized by the aeration.

The aeration is discontinued, and chlorine gas is then introduced into the reaction mixture in a finely-divided stream, until a total of 185 kgs. of chlorine (2.6 kg.-moles) has been absorbed, and the entire manganese content of the slurry converted to the tetravalent state. The reaction mixture is now filtered, and the filtrate reserved as a source for the CaCl₂ solution required in the first step.

The filter cake is washed until free of chloride ion, and may then be used directly, with or without drying, for metallurgical purposes, as a chemical oxidizing agent, etc. There is thus obtained about 1140 kgs. of a manganese dioxide product assaying better than 95% MnO₂ on a dry basis.

*Example II*

A solution of 302 grams of MnSO₄ (2.0 moles) and 19.6 grams of H₂SO₄ (0.2 mole) per liter is obtained by acid-extracting a low grade wad ore containing some manganite and psilomelane (assaying about 20% Mn) and adjusting the concentration of the leach liquor as required.

6200 liters of this leach liquor are treated with 6882 liters of 20% CaCl₂ solution (12.4 kg.-moles) and 70 kgs. of lime (as a slurry containing 330 gms. CaO/liter). The precipitated calcium sulfate is filtered off, washed with a little water, and the filtrate and washings combined.

The MnCl₂ solution thus obtained is oxidized as described in Example I, using 896 kgs. of CaO per batch (as a slurry containing 330 gms. CaO/liter) (16.0 kg.-moles).

About 80% of the total MnCl₂ solution is mixed with the entire quantity of milk of lime, heated by steam to 55°–60° C., aerated for 2½–4 hours until no further increase in MnO₂ titer occurs after 15 minutes of consecutive aeration. The remaining 20% of the total MnCl₂ solution is then added and the aeration continued for 1½–2 hours until a total of 79%–80% of the total manganese is present in the tetravalent state.

The aeration is then discontinued and chlorine gas is then introduced into the reaction mixture in a finely-divided stream, until a total of 185 kgs. of chlorine (2.6 kg.-moles) has been absorbed, and the entire manganese content of the slurry converted to the tetravalent state.

To the reaction mixture, there is now added with good agitation (e. g., by recommencing the passing of air through the mixture) a total of 200 kgs. of 20° Bé. hydrochloric acid, until the reaction mixture no longer reacts alkaline to litmus.

The reaction mixture is now filtered, and the filtrate reserved as a source for the CaCl₂ required in the first step.

The filter cake is washed until free of chloride ion and is then dried in any convenient manner. There is thus obtained 1075 kgs. of chemically pure manganese dioxide, assaying over 99% MnO₂ or close to the theoretical yield.

Having thus fully disclosed my invention and preferred operating embodiments thereof, it will be understood that the invention is not to be limited to precise reagents, conditions or proportions but rather is to be construed to include the use of obvious equivalents, in accordance with the spirit and scope of the appended claims.

I claim:

1. A process for the manufacture of manganese dioxide from an aqueous manganous sulfate solution which comprises the steps of (a) reacting the manganous sulfate solution with a substantially equimolecular amount of calcium chloride and separating the resultant precipitate of calcium sulfate from the resultant solution of manganese chloride, (b) reacting the manganese chloride solution with an equimolecular amount of lime in the presence of a substantial excess of lime and passing an oxygen-containing gas through the resultant suspension of manganous hydroxide and excess lime in calcium chloride solution, whereby the major portion of the divalent manganese is oxidized to the tetravalent valence, and (c) chlorinating the product obtained in step (b) until substantially all of the remaining divalent manganese is oxidized to the tetravalent state, and finally separating the resultant manganese dioxide product from the concomitant calcium chloride solution.

2. A process as defined in claim 1 further characterized in that the aqueous manganous sulfate solution also contains free sulfuric acid which is neutralized in step (a) with a substantially equimolecular amount of lime.

3. A process as defined in claim 1 further characterized in that the aqueous manganous sulfate solution also contains ammonium sulfate which is reacted in step (a) with a substantially equimolecular amount of calcium chloride to form additional calcium sulfate which is precipitated and ammonium chloride which is converted in step (b) into additional calcium chloride and ammonia, the latter of which is volatilized and removed from the reaction mixture.

4. A process as defined in claim 1 further characterized in that the aqueous manganous sulfate solution also contains other heavy metal sulfates which are reacted in step (a) with a substantially equimolecular amount of lime to form additional calcium sulfate which is precipitated and heavy metal hydroxides which are removed with the calcium sulfate precipitate.

5. A process as defined in claim 1 further characterized in that the stoichiometric excess of lime used in step (b) is in the range of 30 to 40%.

6. A process as defined in claim 1 further characterized in that the product from step (c) which contains in addition to precipitated manganese dioxide some precipitated calcium oxide is treated with hydrochloric acid to convert the calcium oxide to additional soluble calcium chloride prior to separation of the manganese dioxide.

7. A process as defined in claim 1 further characterized in that step (b) is carried out in two stages the first consisting in reacting a portion of the manganous chloride solution from step (a) with all of the lime and passing an oxygen-containing gas through the resultant suspension of manganous hydroxide and excess lime in calcium chloride solution and the second consisting in adding the remainder of the manganous chloride solution from step (a) to the resulting oxidation mixture and continuing the passing of oxygen-containing gas through the resultant suspension.

8. A process as defined in claim 7 further characterized in that the oxygen-containing gas used in step (b) is air; and in that the suspension through which air is passed in step (b) is warmed to about 55–60° C. by steam.

JONAS KAMLET.

REFERENCES CITED

The following references are of record in the file of this patent:

FOREIGN PATENTS

| Number | Country | Date |
|---|---|---|
| 2,501 | Great Britain | of 1867 |
| 9,271 | Great Britain | of 1893 |
| 483,333 | Great Britain | Apr. 19, 1938 |
| 597,824 | Great Britain | Feb. 4, 1948 |

OTHER REFERENCES

Lunge: Sulfuric Acid and Alkali, vol. 3, pages 391–437, Gerney and Jackson, London, 1911.

Latimer and Hildebrand: Reference Book on Inorganic Chemistry, Rev. Ed., page 506, MacMillan Co., New York, 1940.